United States Patent [19]

Tabuchi et al.

[11] 4,277,003

[45] Jul. 7, 1981

[54] DEVELOPING MATERIAL SUPPLYING DEVICE

[75] Inventors: Kenji Tabuchi, Sakai; Hidehito Iwata, Toyohashi, both of Japan

[73] Assignee: Minolta Camera Kabushiki Kaisha, Osaka, Japan

[21] Appl. No.: 76,955

[22] Filed: Sep. 19, 1979

[30] Foreign Application Priority Data

Sep. 19, 1978 [JP] Japan .......................... 53-129280[U]
Dec. 28, 1978 [JP] Japan .......................... 53-180190[U]

[51] Int. Cl.³ .......................................... G01F 11/10
[52] U.S. Cl. .......................... 222/350; 222/DIG. 1; 222/368
[58] Field of Search ................ 222/DIG. 1, 345, 346, 222/349-351, 359, 360, 367, 368, 311-313, 315, 363; 221/266

[56] References Cited

U.S. PATENT DOCUMENTS 1,765,622 6/1930 Schoen ................................ 222/359
1,768,826 7/1930 Campbell ............................ 222/360
2,317,274 4/1943 Johnson .............................. 222/368
2,906,437 9/1959 Wallis ................................. 222/349
3,231,105 1/1966 Easley ................................ 222/368
3,840,156 10/1974 Fujimoto ............................ 222/350

FOREIGN PATENT DOCUMENTS 50-110654 9/1975 Japan .
52-20839 2/1977 Japan .

*Primary Examiner*—H. Grant Skaggs
*Attorney, Agent, or Firm*—Wenderoth, Lind & Ponack

[57] ABSTRACT

An improved developing material supplying device for use in a developing apparatus of an electrophotographic copying machine which includes a developing material supplying roller having at least one developing material measuring recess formed by cutting the peripheral surface of the supplying roller into flat shape and rotatably provided at a developing material supplying opening of a developing material storage tank, a driving mechanism for the supplying roller, a developing material measuring regulating member provided where the recess of the supplying roller at the supplying opening is rotated from inside to outside of the storage tank, and a shield member capable of covering the entire surface of the recess and provided where the recess at the supplying opening moves from outside to inside of the storage tank.

7 Claims, 12 Drawing Figures

DEVELOPING MATERIAL SUPPLYING DEVICE

BACKGROUND OF THE INVENTION

The present invention relates to a developing material supplying device for supplying developing material to an electrostatic latent image developing apparatus for use in an electrophotographic copying apparatus and the like.

Commonly, in the electrostatic latent image developing apparatus as described above, it is necessary to supply the developing material for replenishment at proper intervals as the development proceeds, and the amount of the developing material to be supplied for the replenishment must be properly measured so as not to be excessively large or excessively small.

In order to meet the requirements as stated above, there have conventionally been proposed and put into practical use various developing material supplying devices, the representative one of which includes an arrangement wherein a developing material supplying roller having V-shaped notches or recessed portions in part of its peripheral surface for the replenishment of the developing material is rotatably provided for being driven at a developing material supplying opening or port formed at the lower part of a developing material storage tank.

Even the known developing material supplying device as described above still has various disadvantages to be overcome, and improvements thereof have been greatly desired.

In view of such a need, the present inventors have carried out a series of experiments and analyses on the above developing material supplying device for clarification of causes of the disadvantages, as a result of which it has been found that:

(i) during the replenishment of the developing material, since the developing material to be replenished tends to be undesirably packed too tightly in the V-shaped recessed portions owing to variations of ambient conditions such as ambient humidity, etc., the amount of the developing material to be measured by the V-shaped recesses for the replenishment to the developing apparatus is liable to vary to a large extent.

(ii) moreover, since the seal provided at the developing material supplying opening in the lower part of the developing material storage tank for preventing the developing material from leaking is not perfect, the amount of the developing material to be supplied to the developing apparatus tends to vary due to undesirable leakage of the developing material. Mere improvements in the degree of closeness of contact between the wall surface (the wall surface defining the developing material supplying opening) of the storage tank and the peripheral surface of the developing material supplying roller result in an abnormal increase of rotational driving torque for said supplying roller, with consequent troubles arising therefrom, and thus, it has been necessary to tolerate the imperfectness of the seal as described above.

(iii) Furthermore, due to the fact that the amount of rotation of the developing material supplying roller is determined by the time period during which said supplying roller is coupled with a driving source, errors tend to take place in the amount of rotation, thus making it impossible to achieve a stable control of the amount of rotation of the supplying roller in a strict sense, and following the errors in the amount of rotation as described above, the amount of the developing material to be supplied to the developing device also varies to a certain extent. During the experiments and analyses as described above, it has simultaneously been confirmed by the present inventors that in the conventional developing material supplying device as described above, the developing material is undesirably compressed and tends to solidify in a position between the developing material supplying opening and developing material supplying roller following rotation of said supplying roller.

SUMMARY OF THE INVENTION

Accordingly, an essential object of the present invention is to provide a developing material supplying device for supplying developing material to an electrostatic latent image developing apparatus for use in an electrophotographic copying machine and the like, which is capable of positively supplying a predetermined amount of developing material with a perfect shielding against leakage of the developing material, and free from disadvantages such as an increase of the rotational driving torque for a developing material supplying roller.

Another important object of the present invention is to provide a developing material supplying device of the above described type which is stable and accurate in functioning and which has a simple construction, and can be readily incorporated into various electrophotographic copying machines at low cost.

In accomplishing these and other objects, according to one preferred embodiment of the present invention, the developing material supplying device is arranged as follows.

(1) For eliminating the disadvantages as described in the item (i) discussed earlier:

(a) the recessed portions for the developing material replenishment in the developing material supplying roller have each been formed into a flat shape.

(b) moreover, a developing material scraping member has been provided so as to be in pressure contact with the peripheral surface of the developing material supplying roller located outside the developing material supplying opening of the developing material storage tank.

(2) Also for eliminating the disadvantages referred to in the item (ii) discussed earlier, and also for preventing the solidification of the developing material:

(a) there is provided, at the developing material supplying opening of the developing material storage tank, a movable regulating member for measurement which is held in pressure contact with the peripheral surface of the supplying roller so as to be capable of covering the all of the surfaces of the recessed portions of the supplying roller and located at a position where the recessed portions move from the interior of the tank toward the exterior thereof through the developing material supplying opening as said developing material supplying roller is driven for rotation. Simultaneously, there is also provided, at the developing material supplying opening of the developing material storage tank, a movable shield member which is held in pressure contact with the peripheral surface of said supplying roller so as to be capable of covering all the surfaces of the recessed portions of the supplying roller and located at a position where the recesses move from the exterior of the storage tank toward the interior thereof through the developing material supplying opening as said supplying roller is driven for rotation.

(b) furthermore, by providing said recessed portions only at the central portion of the developing material supplying roller in the longitudinal direction thereof, the inner faces of said regulating member for measurement and shield member are arranged to contact under pressure at least the circumferential surfaces at opposite ends of said supplying roller.

(c) moreover, the regulating member for measurement and shield member are arranged to be pivotable about respective axes so as to be urged by biasing means toward the peripheral surface of the developing material supplying roller for pressure contact therewith.

(d) in addition, said regulating member and shield member are provided beyond a straight line connecting the pivotal central axes and the rotational central axis of the developing material supplying roller at the side of rotational direction of said developing material supplying roller.

(3) Furthermore, for eliminating the disadvantages stated in the item (iii) discussed earlier:

to drive said developing material supplying roller, there is provided a driving mechanism which includes an eccentric cam plate the rotation of which is stopped after completion of exactly one rotation by a one-rotation clutch, a reciprocating movable member subjected to the reciprocating movement by said cam plate, and one-way clutch means for converting the one directional movement of said reciprocating movable member into the rotation of said developing material supplying roller.

BRIEF DESCRIPTION OF THE DRAWINGS

These and other objects and features of the present invention will become apparent from the following description taken in conjunction with the accompanying drawings, in which.

Figure 5:
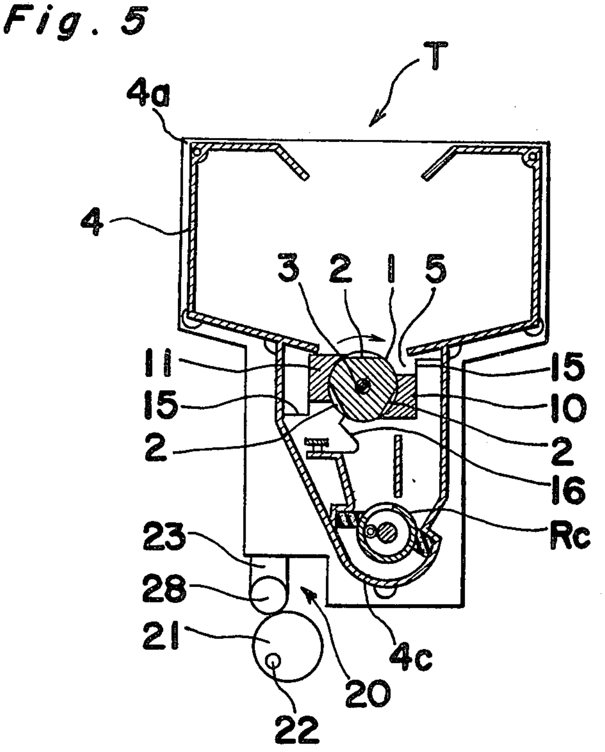
FIG. 5 is a side sectional view, on a reduced scale, of the developing material supplying device similar to FIG. 4, which is explanatory of the functioning of driving means for a developing material supplying roller employed in the arrangement of FIG. 4.
Figure 6:
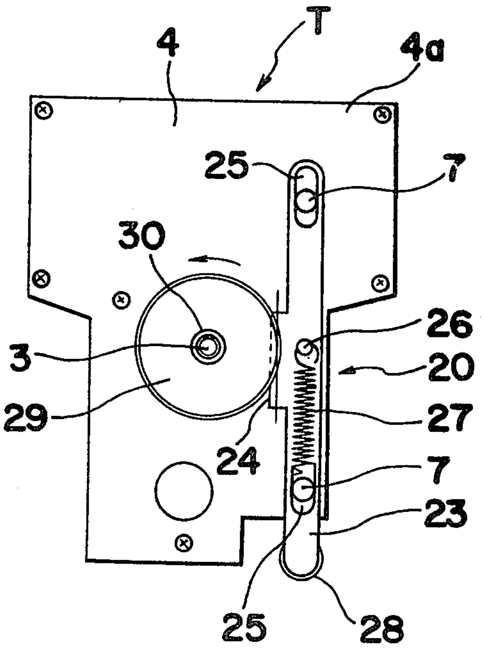
FIG. 6 is an elevation of the opposite end of the developing material supplying device of FIG. 5.
Figure 10:
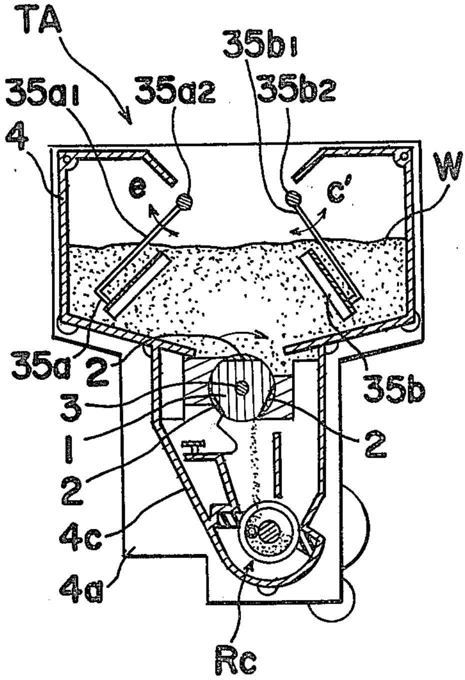
FIG. 10 is a view similar to FIG. 5, which particularly shows a further modification thereof.
Figure 11:
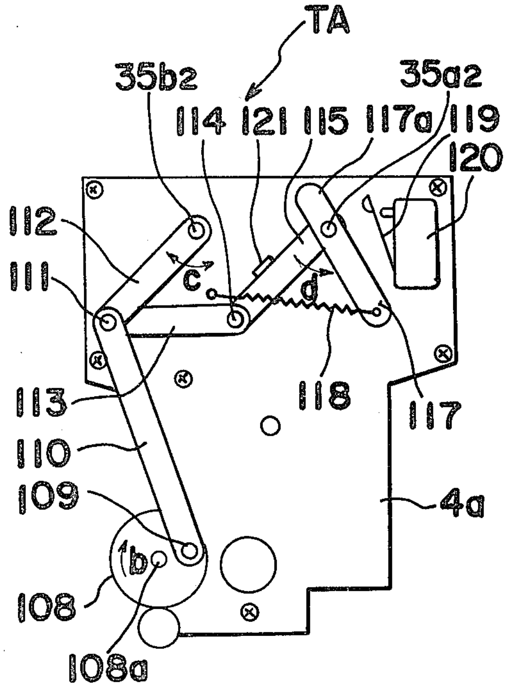
FIG. 11 is an elevation view of the opposite end of a modification of FIG. 10.
Figure 12:
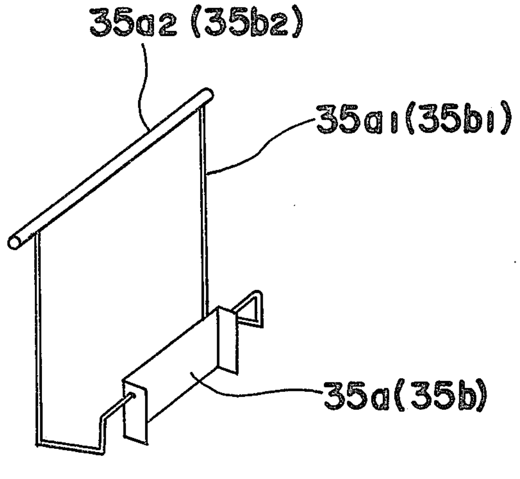
FIG. 12 is a perspective view showing, on an enlarged scale, the structure of a developing material stirring plate employed in the arrangement of FIG. 10.

It should be noted here that in FIGS. 5, 6 and 7, developing material stirring plates, stirring plate driving means and the means for detecting the remaining amount of material to be described with reference to FIGS. 10 to 12 are not shown, while in FIGS. 10 and 11, the developing material supplying roller driving mechanism shown in FIGS. 5 and 6 is simplified for clarification.

Before the description of the present invention proceeds, it is to be noted that like parts are designated by like reference numerals throughout several views of the accompanying drawings.

DETAILED DESCRIPTION OF THE INVENTION

Figure 1:
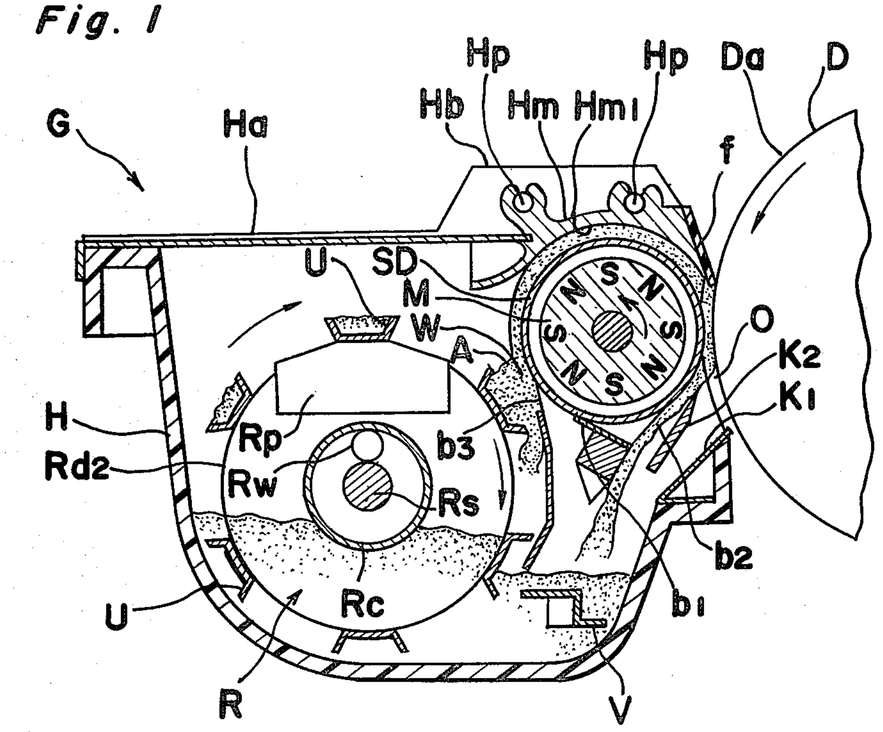
FIG. 1 is a schematic side sectional view of a dry process developing apparatus to which a developing material supplying device according to the present invention may be applied.

Referring now to the drawings, in the first place, the construction of a dry process developing apparatus to which the present invention may be applied is described hereinbelow with particular reference to FIGS. 1 to 3. In FIG. 1, the dry process developing apparatus G which employs developing material prepared, for example, by mixing and stirring magnetizable particles and electrically insulating non-magnetizable particles generally includes a housing or casing H extending the width of a known photoreceptor D in the form of a drum and substantially enclosed except for an opening O adjacent to the photosensitive or photoreceptor surface Da of the photoreceptor D whereat the development of electrostatic latent images formed on the photoreceptor surface Da is effected, an outer cylinder or developing sleeve SD rotatably provided in the housing H adjacent to the photoreceptor surface Da, a rotary magnet or multipolar magnet member M rotatably enclosed in the developing sleeve SD, and a developing material transport device R provided in the housing H under the developing roller SD. The developing material supplying device T not shown in FIG. 1 and directly related to the present invention is disposed above a cylinder member Rc of the developing material transport device R for feeding toner into the developing apparatus G in a manner described later with reference to FIGS. 4 to 8.

The developing sleeve SD of cylindrical configuration made of non-magnetizable electrically conductive material such as aluminum is disposed for rotation counterclockwise, for example, at approximately 30.2 r.p.m. in a position close to the surface Da of the photoreceptor D which is also capable of rotating counterclockwise. The multipolar magnet member M of roll-like configuration has magnetic poles N and S sequentially arranged around its outer periphery at alternately different polar orientation as shown and is adapted to rotate at a speed of 1300 r.p.m. in the same direction as the developing sleeve SD. More specifically, the developing material W is subjected to a moving force in the counterclockwise direction by the rotation of the developing sleeve SD and in the clockwise direction by the magnet member M, and consequently is moved over the developing sleeve SD in the clockwise direction by the difference in revolutions between the developing sleeve SD and the magnet member M. The housing H further includes side walls Hb and an upper wall Ha above and adjacent to the developing sleeve SD, and a casing member Hm forming a part of the upper casing Ha and held in position by pins Hp and the forward end of said upper casing Ha, while the inner peripheral surface Hm1 of the casing member Hm is formed into an arcuate cross section for contact with the magnetic brush to be formed on the developing sleeve SD. Moreover, at the forward end of the casing member Hm and on an extension of the arc of the inner peripheral surface HM1 thereof, a resilient insulative sealing member f is disposed to contact the surface Da of the photoreceptor drum D. On the other hand, below the developing sleeve SD, there are provided a developing material spilling prevention plate K1 fixed to one edge of the housing H, a developing material scattering prevention plate K2, an auxiliary cleaner blade b1 and a developing material scraper b2 respectively arranged to contact the developing sleeve SD in a direction opposite and the same as the direction of rotation of the developing sleeve SD, another cleaner blade b3 disposed to contact the developing sleeve SD in the direction opposite the direction of rotation thereof, and a developing material feeding vane V rotatably disposed for clockwise rotation.

The developing material W successively and continuously brought up to a position A to be influenced by the moving force due to the rotation of the magnet member M by trough-like members U of the developing material transport device R is moved from the position A over the developing sleeve SD in the form of the magnetic brush in the clockwise direction so as to rub against the electrostatic latent image formed on the surface Da of the photoreceptor drum D in a known manner for the development of said latent image. The developing material W after the development is scraped off the developing sleeve SD by the scraper b2 and further fed into the trough-like members U of the developing material transport device R by rotation of the feeding vane V.

Figure 2:
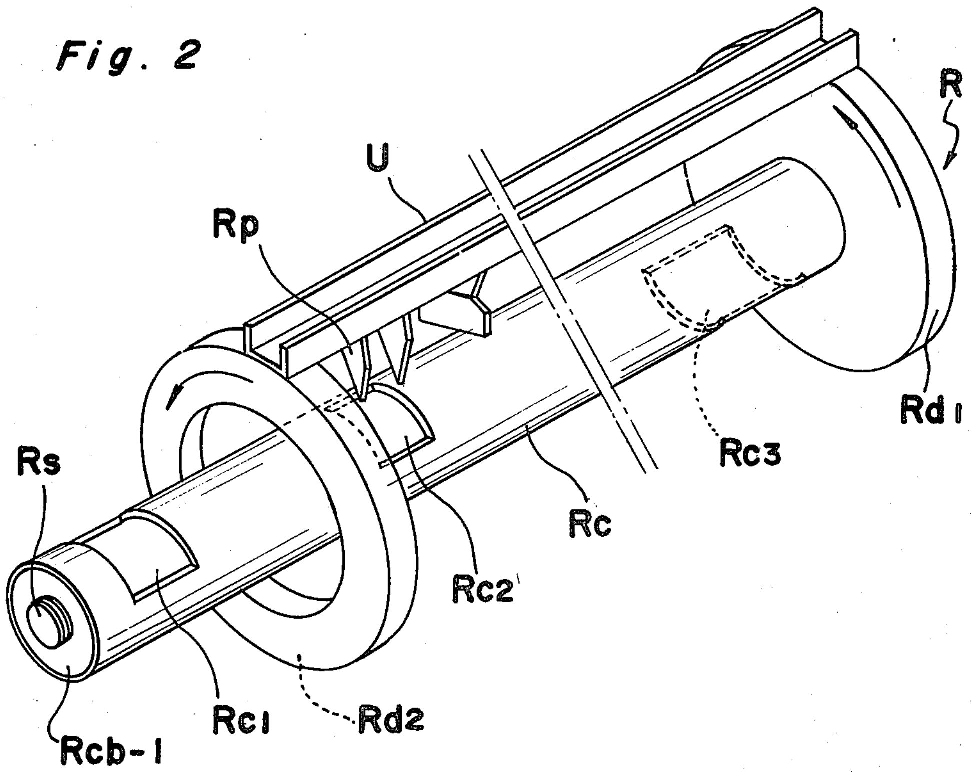
FIG. 2 is a perspective view showing, on an enlarged scale, the construction of a developing material transport device employed in the arrangement of FIG. 1.
Figure 3:
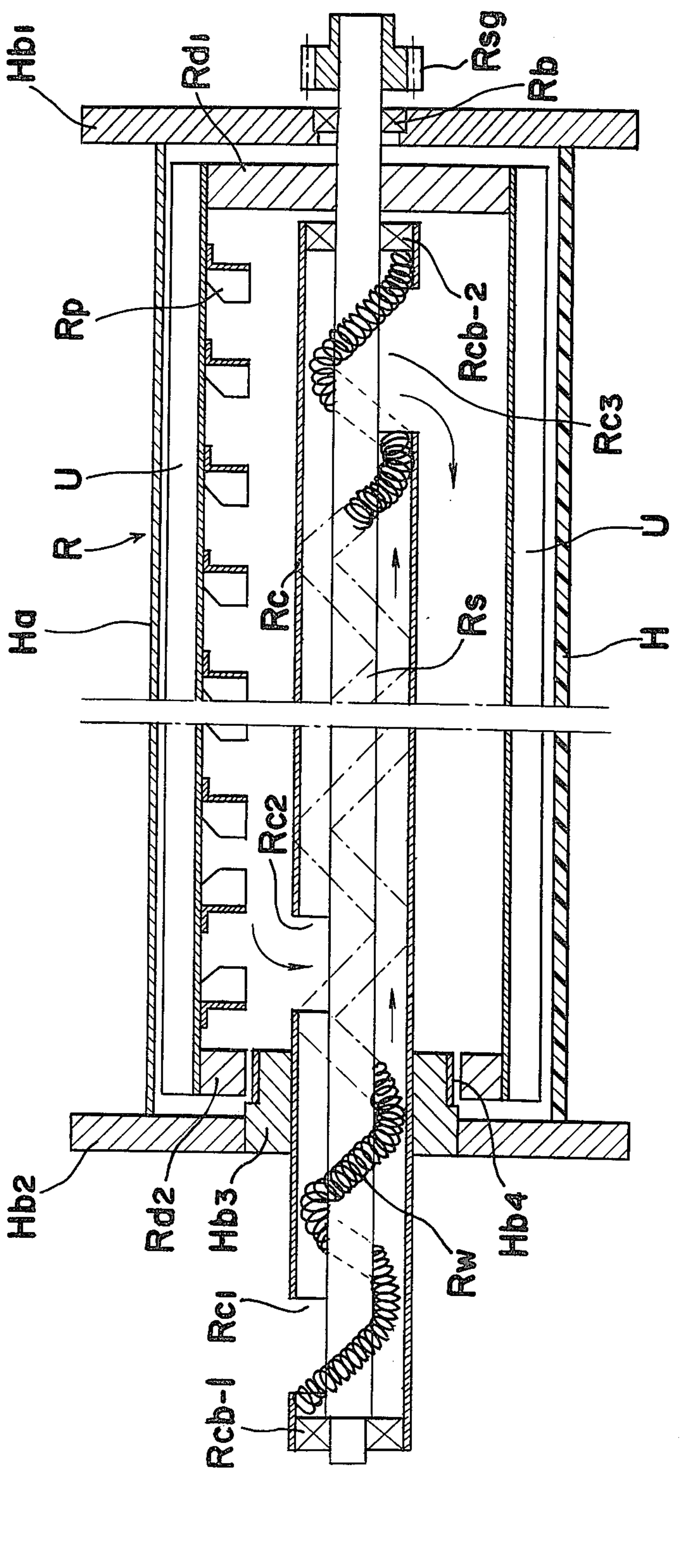
FIG. 3 is a side sectional view showing, on a still more enlarged scale, the construction of the developing material transport device of FIG. 2.

Referring also to FIGS. 2 and 3, the developing material transport device R generally includes a rotary shaft Rs with the axis extending through the developing apparatus housing H, rotary discs Rd1 and Rd2 mounted on the shaft Rs in a manner described later, a plurality of the trough-like members U each having a U-shaped cross section and axially disposed at regular intervals around the peripheral edges of the rotary discs Rd1 and Rd2 in a paddle wheel-like configuration as shown, a plurality of plate-like members Rp secured to inner surfaces of the corresponding trough-like members U, the cylinder member Rc partially surrounding the rotary shaft Rs, and a coil spring Rw spirally wound around the rotary shaft Rs within the cylinder member Rc so as to function as a developing material transport member. The rotary shaft Rs is rotatably supported at its one end by a side wall Hb1 of the developing apparatus G in a bearing Rb, while the other end of the shaft Rs is also rotatably journalled in a bearing Rcb-1 provided at one end of the cylinder member Rc extending through the other side wall Hb2 of the developing apparatus G, and at the extreme end of the shaft Rs extending through the side wall Hb1, there is secured a gear Rsg for connecting the shaft Rs to a suitable driving means (not shown). The cylinder member Rc has three square openings Rc1, Rc2 and Rc3 formed in spaced relation in the outer periphery thereof as is most clearly seen in FIG. 3, and is fixedly supported by a fixed bearing Hb3 mounted in the side wall Hb2 so as to surround the rotary shaft Rs, while the bearings Rcb-1 and Rcb-2 provided at opposite ends of the cylinder member Rc rotatably support the rotary shaft Rs. The opening Rc1 is formed in the portion of the cylinder member Rc extending from the side wall Hb2 i.e., from the developing apparatus G into the developing material supplying device T as shown in FIG. 7 and is directed upward to receive developing material to be supplied from said developing material supplying device or used developing material collected from the surface Da of the photoreceptor drum D. The other openings Rc2 and Rc3 are formed at portion of the cylinder member Rc housed in the developing apparatus G and adjacent to the rotary discs Rd1 and Rd2 so as to be directed upwardly and downwardly as shown in FIG. 3. It is to be noted here that the number of the openings may be further increased depending on necessity. The coil spring Rw spirally wound around the rotary shaft Rs over the total length in the interior of the cylinder member Rc is secured at opposite ends thereof to the rotary shaft Rs, and rotated simultaneously with the rotary shaft Rs, upon clockwise rotation of the rotary shaft Rs in FIG. 1 so as to move the developing material in the axial direction or rightward in FIGS. 2 and 3, while stirring the developing material in the direction of its rotation within the cylinder member Rc.

The rotary disc Rd1 is fixed at the one end of the rotary shaft Rs, while the other rotary disc Rd2 is rotatably supported, through a bushing Hb4, for example, of sintered metal, on the fixed bearing Hb3 secured in the side wall Hb2 of the developing device G, with the trough-like members U being disposed parallel to the shaft axis and in spaced and parallel relation to each other at regular intervals between the peripheral edges of the rotary discs Rd1 and Rd2 as mentioned previously.

By the above arrangement, the developing material W newly supplied from the developing material supplying device T (FIG. 7) into the opening Rc1 of the cylinder member Rc is transferred rightward in FIG. 2 while being stirred within the cylinder member Rc in the direction of rotation by the coil spring Rw rotated in synchronization with the rotary shaft Rs, and is led out of the cylinder member Rc through the opening Rc3 to be moved leftward in FIG. 1, while being agitated in the direction of rotation at the outside of the cylinder member Rc by the plate members Rp rotating in synchronization with the rotation of the rotary shaft Rs, during which time, part of the developing material is scooped up by the trough-like members U to be further transported up to the region A in FIG. 1. The developing material is carried over the peripheral surface of the developing sleeve SD in the clockise direction by the action of the multipolar magnet member M for developing the electrostatic latent image formed on the surface Da of the photoreceptor drum D into a visible image. Meanwhile, the developing material which is not scooped up by the trough-like members U is moved leftward, while being stirred by the plate-members Rp so as to again enter the interior of the cylinder member through the opening Rc2.

Figure 4:
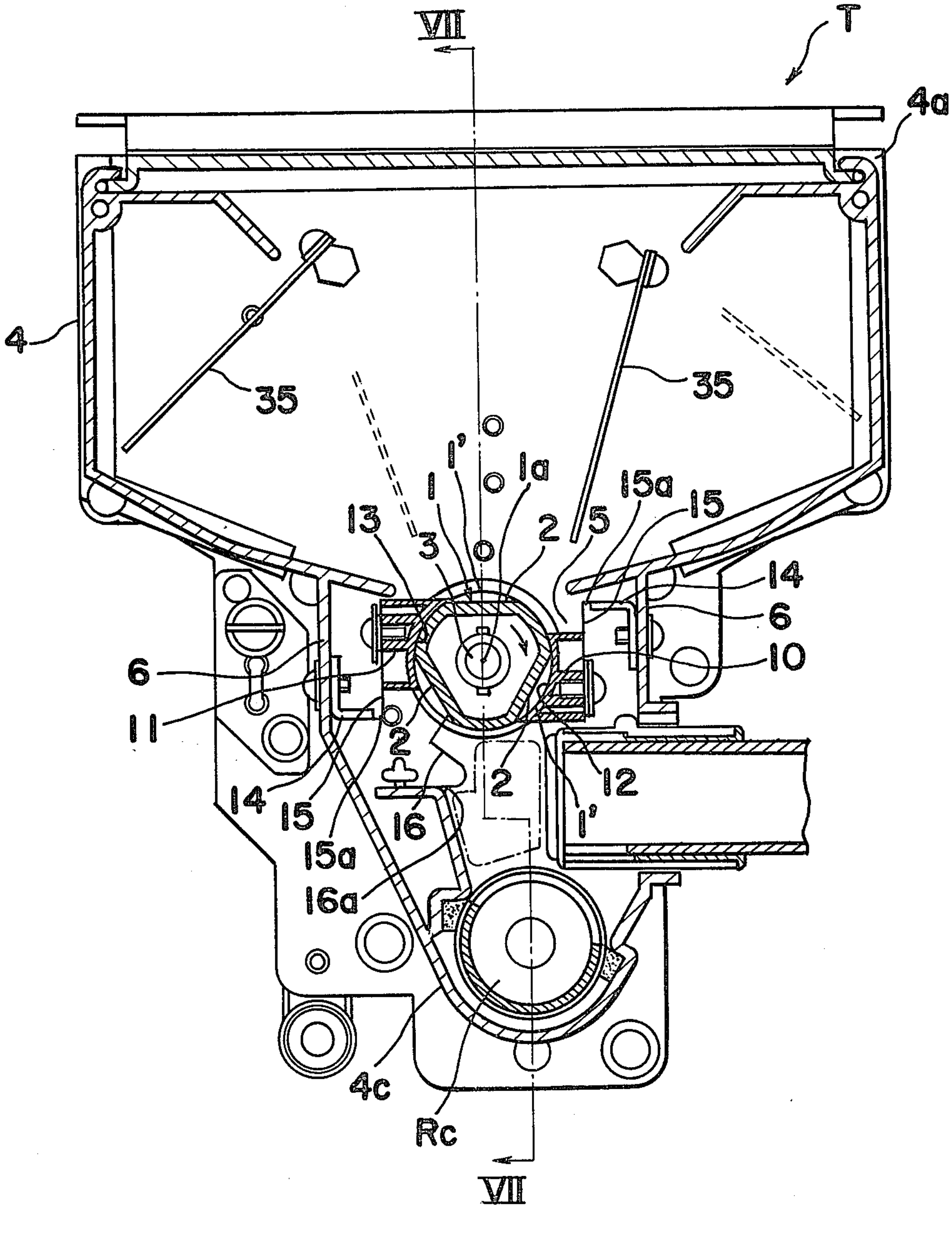
FIG. 4 is a side sectional view of the developing material supplying device according to one preferred embodiment of the present invention.

Referring now to FIGS. 4 through 8, there is shown in FIG. 4 the developing material supplying device T according to one preferred embodiment of the present invention. The developing material supplying device T generally includes a developing material storage tank 4 accommodating therein the developing material (not shown here) to be fed, a developing material supplying roller 1 of cylindrical shape having three flat recessed portions 2 for measuring the developing material which are radially formed in the axial direction at equal intervals on the outer periphery of the roller 1 so as to extend over the entire length of the roller 1 except for the opposite ends 1' (FIG. 7) of said roller 1, and rotatably supported, on a shaft 3 thereof, in a developing material supplying opening 5 formed at the lower portion of the storage tank 4 for rotation in the clockwise direction in FIG. 4, and a regulating member 10 for measuring the developing material to be fed and a shield member 11 which are provided adjacent to the supplying roller 1 for contact with said roller 1 in a manner as described hereinbelow, with the supplying roller 1, members 10 and 11, and cylinder member Rc of the developing material transport device R being enclosed in a lower casing 4c contiguous to the storage tank 4.

The regulating member 10 and shield member 11 are both made of smooth and rigid material such as plastic and are respectively provided with contact surfaces 12 and 13 each having a width extending over the entire longitudinal length of the supplying roller 1 and formed into an arcuate shape with the same radius of curvature as that of the peripheral surface of the supplying roller 1, the opposite ends of each of the contact surfaces 12 and 13 being adapted to contact under pressure the corresponding opposite ends 1' of the supplying roller 1 where the flat recessed portions 2 are absent as described earlier. Accordingly, when the flat recessed portions 2 of the roller 1 are brought to positions confronting the contact surfaces 12 of the regulating member 10 and shield member 11, said contact surface 12 defines a developing material replenishing space in cooperation with the recessed portions 2 due to the presence of the opposite ends 1' of the supplying roller 1.

More specifically, the regulating member 10 is disposed in a position where the recessed portions 2 move from the interior of the storage tank 4 toward the cylinder member Rc of the developing material transport device R, while the shield member 11 is provided in a position where said recessed portions 2 move from the side of the cylinder member Rc of the developing material transport device R toward the interior of the storage tank 4 as the supplying roller 1 rotates in the clockwise direction. Both of the members 10 and 11 are respectively secured to plate-like spring members 15 fixed to frames 6 of the storage tank 4 by corresponding brackets 14 so that the contact surfaces 12 and 13 thereof are urged to contact under suitable pressure the peripheral surfaces of the supplying roller 1 which rotates clockwise. It is to be noted here that the contact surfaces 12 and 13 are disposed in the direction of rotation of the roller 1 from a straight line connecting the supporting points (pivotal axes) 15a of the spring members 15 and the axis 1a of said roller 1, so that when the supplying roller 1 is driven for rotation in the clockwise direction by driving means 20 described later with reference to FIGS. 5 to 7, the contact surfaces 12 and 13 are adapted to shift away from the peripheral surface of the roller 1 and thus, they are prevented (especially at corner portions thereof) from cutting into the peripheral surface of the roller 1 to unnecessarily compress the developing material or to cause an increase in the rotational torque needed to drive said roller 1. Below and adjacent to the supplying roller 1, there is disposed a developing material scraping member 16 of resilient material, with its forward edge adapted to contact under pressure the peripheral surface of the roller 1 at a position where the roller 1 has passed through the regulating member 10. The supporting point 16a and forward end portion of the scraping member 16 are arranged in exactly the same relation with respect to the axis 1a of the roller 1 as in the regulating member 10 described earlier.

Referring also to FIGS. 5 to 8, the driving means 20 for rotating the supplying roller 1 will be described hereinbelow.

Figure 8:
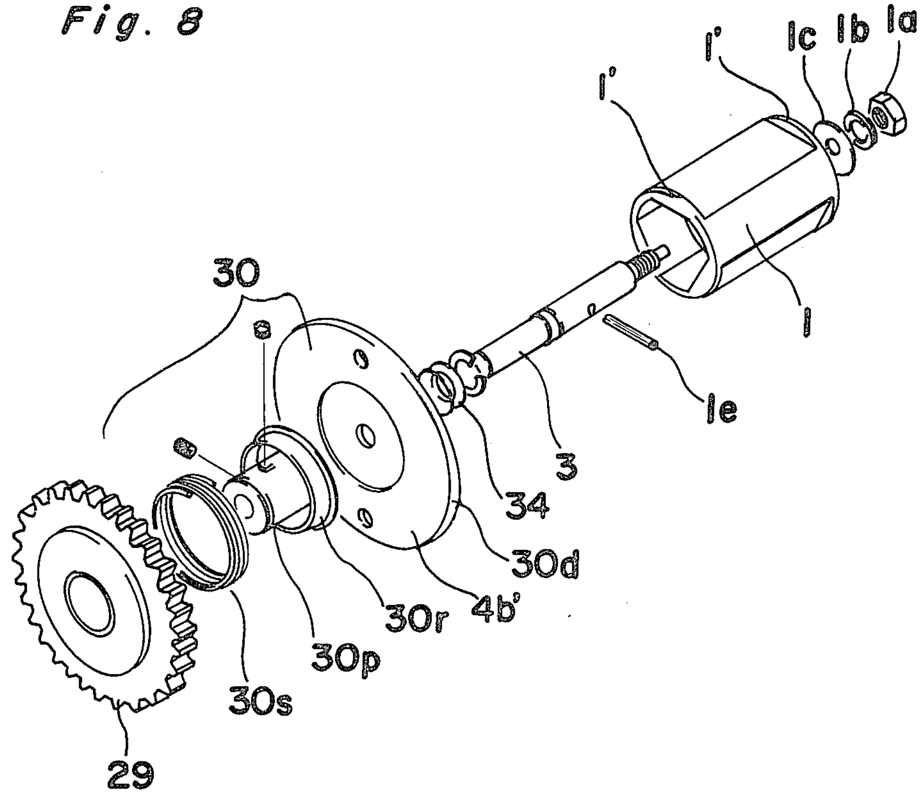
FIG. 8 is a perspective view showing on an enlarged scale, the construction of the developing material supplying roller employed in the arrangement of FIG. 4.

Below and adjacent to one side wall 4a of the storage tank 4 and the lower casing 4c, there is provided and eccentric cam plate 21 the position of eccentricity of which is adjustable and which is secured to a shaft to be stopped from rotating after exactly one rotation by a one rotation clutch (not shown), for example secured, to a rotatable shaft 22 which is stopped from rotating after having been rotated exactly one rotation by the one rotation clutch at every copying operation for making one copy as in the copy paper feeding roller (not shown) which feeds copy paper sheets in a cassette into a copying apparatus (not shown). On the one side wall 4a of the storage tank 4 in a position above the cam plate 21, a lever 23 is mounted for vertical movement, with a pair of spaced elongated openings 25 which are formed therein having slidably engaged therein corresponding pins 7 fixed to said one side wall 4a. The lever 23 has a rack portion 24 formed along one side edge, while a coil spring 27 is connected between the lower one of the pins 7 and another pin 26 fixed on the lever 23 for urging said lever 23 downward in FIGS. 5 and 6. At the lower end of the lever 23, a roller 28 is rotatably mounted for contact with the peripheral surface of the cam plate 21. As shown in FIG. 8, a spur gear 29 is mounted at one end of the shaft 3 of the supplying roller 1 through one way clutch 30 including a kick spring 30s, a spindle 30p, clutch rings 30r, etc., while the roller 1 is mounted on the other end of the shaft 3 by a washer 1c, a spring washer 1b and a nut 1a screwed onto a threaded portion at said other end of the shaft 3, and a split pin 1e, and the spur gear 29 is in mesh with the rack 24 of the lever 23. The one way clutch 30 is arranged to transmit rotational force to the shaft 3, i.e. to the supplying roller 1 only when the spur gear 29 is rotated in the counterclockwise direction in FIG. 6, and to rotate idly when the spur gear 29 is rotated in the clockwise direction.

In the above arrangement, since the point of eccentricity of the above cam plate 21 is adjustable, the amount of vertical movement of the lever 23 can be altered by adjusting said position of eccentricity of the cam plate 21. Accordingly, the amount of the developing material to be supplied may be adjusted through fine adjustment of the rotational angle of the developing material supplying roller 1 by the adjustment of the position of eccentricity of the cam plate 21 as described above.

Although in the foregoing embodiment, the developing material supplying roller 1 is arranged to rotate through 120° at every copying operation for replenishing the developing material corresponding to one of the recesses 2, if the rotational angle is set to be x° by the adjustment of the position of eccentricity as described in the foregoing, it is possible to adjust so as to replenish the developing material corresponding in amount to the number x of the recesses 2 at every copying operation for 120 copies.

Figure 7:
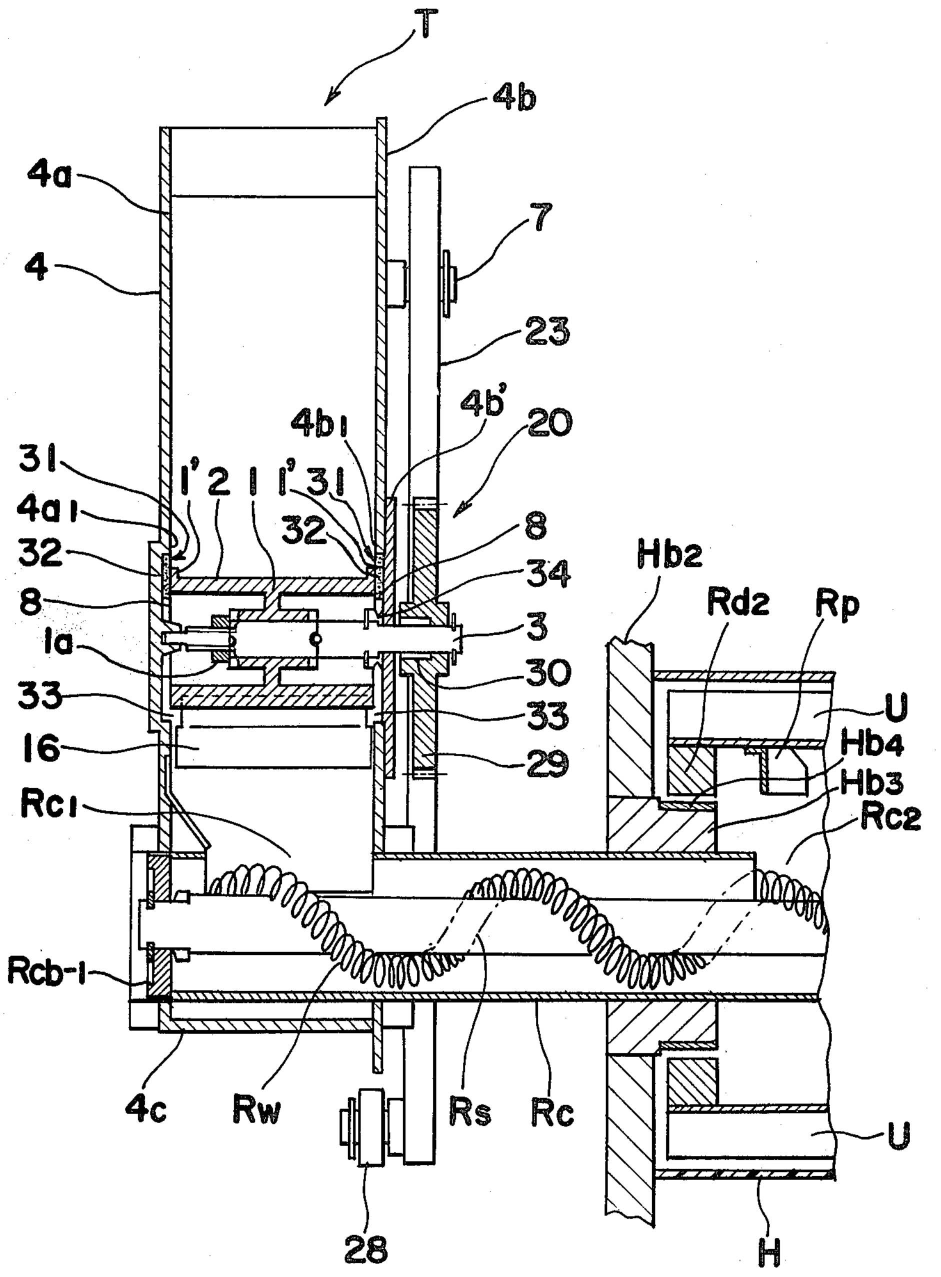
FIG. 7 is a cross section taken along the line VII—VII of FIG. 4.

Referring particularly to FIG. 7, in the side walls 4a, 4b and 4b' of the storage tank 4 and lower casing 4c in positions corresponding to the opposite end faces of the supplying roller 1, there are formed concave portions 8 in which end portion shield members 31 each made, for example, of polyester film 32 having a resilient member such as polyurethane foam, etc. stuck to its rear face are secured, with the arcuate portions on the upper halves of said end faces of the roller 1 being arranged to contact under suitable pressure the surfaces of the polyester films 32 of said shield members 31, and spaces 33 are defined between the concave portions 8 and the lower halves of the opposed faces of the roller 1. Meanwhile, in the concave portion 8 of the side wall 4b' in a position where the shaft 3 extends through the side wall 4b', a V ring 34 is provided for shielding the bearing portion of said shaft 3. Moreover, as shown in FIG. 4, a pair of developing material stirring plates 35 to be described more in detail later are provided in the developing storage tank 4 for pivotal movement within the tank 4 in association with the movement of the driving means 20 so as to guarantee positive filling of the developing material into the recesses 2 of the developing material supplying roller 1.

The operation of the developing material supplying device T according to the present invention will be described hereinbelow.

The operation of the driving means 20 is such that, upon rotation of the shaft 22 of the copy paper feeding roller and consequently of the cam plate 21, the lever 23 is driven upwardly through the roller 28 against the urging force of the coil spring 27, and the spur gear 29 in mesh with the rack 24 of the lever 23 is rotated counterclockwise, for example, through 120° in FIG. 6, and thus, the supplying roller 1 is also rotated counterclockwise in FIG. 6 (clockwise in FIG. 4) through 120° via the one way clutch 30. Upon further rotation of the cam plate 21, the lever 23 is moved downward by the urging force of the coil spring 27, with resulting clockwise rotation of the spur gear 29 through 120° in FIG. 6, but in the above case, the one way clutch 30 remains inoperative without rotation of the roller 1. In other words, the lever 23 performs one upward and downward movement for each rotation (i.e. copying operation for one making copy) of the copy paper feeding roller shaft 22, and rotates the supplying roller 1 clockwise by 120° in FIG. 4 at every cycle of the upward and downward rotation of said lever 23. In synchronization with the above movement, the developing material stirring plates 35 are also pivoted from the positions shown by real lines to the positions shown by dotted lines in FIG. 4.

Following the rotation of the supplying roller 1 as described above, the developing material (not shown here) accommodated in the developing material storage tank 4 is filled into the recesses 2 for the measurement of the roller 1, and as it passes the regulating member 10, excessive developing material is removed by said regulating member 10 so as to be dropped into the opening Rc1 (FIG. 7) of the cylinder member Rc of the developing material transport device R of the developing apparatus G after passing the regulating member 10 as described with reference to FIGS. 1 to 3. Meanwhile, the developing material tightly packed into the recesses 2 of the roller 1 is completely scraped off by the scraping member 16 also for the replenishment. As described above, the developing material supplying roller 1 is rotated by 120° during one rotation of the copy paper feeding roller shaft 22 so that the three recesses 2 are sequentially brought one by one above the opening Rc1 of the cylinder member Rc of the developing material transport device R for the supply thereto of a predetermined amount of developing material.

In the above case, since each of the recesses 2 is in a flat shape, the developing material packed in the recesses 2 is positively scraped off therefrom by the scraping member 16. Meanwhile, the peripheral portion of the supplying roller 1 is sufficiently sealed by the close adhesion of the contact surfaces 12 and 13 of the regulating member 10 and shield member 11 with respect to the peripheral surface of the roller 1. Furthermore, the opposite end portions of the supplying roller 1 are properly sealed by the contact thereof with the end portion shield members 31 under suitable pressure. Since the end portion shield members 31 are arranged to contact the arcuate upper halves of the opposite end faces of the roller 1, with the spaces 33 formed adjacent to the lower halves of said end faces, the sealing effect is not reduced, and there is no need to increase the torque of the roller 1. Moreover, owing to the arrangement by which the rotation of the roller 1 is controlled by the driving means 20 in synchronization with the copying operation for making one copy during which the copy paper feeding roller shaft 22 performs one rotation, and said driving means 20 converts the rotational movement into the linear motion of the lever 23 through the cam plate 21 for controlling the angle of rotation of the roller 1, a predetermined amount of the developing material is positively supplied each time the copying machine is operated to make one copy.

It should be noted here that, according to the present invention, the number and size of the recessed portions 2 of the roller 1 and the angle of rotation of said roller 1 through which it is driven by the driving means 20 may be suitably determined according to the amount of the developing material it is desired to feed, and that the driving means 20 is not limited to the one as described with reference to the foregoing embodiment, but may be modified in various ways, for example, by replacing the coupling between the rack 24 and spur gear 29 by a coupling having pins, etc. Furthermore, the sealing at the opposite end portions of the roller 1 may be so arranged that the end portion shield member 31 are modified to be made only of polyester film and secured at their upper ends to portions 4a1 and 4b1 located above the concave portions 8 of the side walls 4a and 4b instead of being secured in the concave portions 8 as in the foregoing embodiment so that the lower portions of said modified end portion shield members contact under suitable pressure the upper arcuate halves of the end faces of the roller 1 in the spaces of said portions 8. By the modified arrangement as described above, the desired sealing effect can also be achieved.

Figure 9:
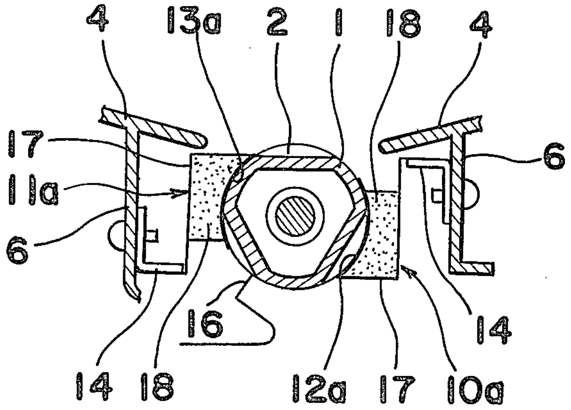
FIG. 9 is a cross sectional view showing on an enlarged scale, an arrangement for the developing material supplying roller of the developing material supplying device according to a modification of the present invention.

It should also be noted that, as shown in FIG. 9, the regulating member 10 and shield member 11 described as employed in the embodiment of FIGS. 4 to 8 may be replaced by corresponding members 10a and 11a of shaped plate-like elastic members 17 made, for example, of phosphor bronze plates, etc. and secured to the brackets 14, with resilient members 18 such as urethane foam being provided in the space surrounded with the elastic members 17. In the above case, the radius of curvature of the contact surfaces 12a and 13a of the elastic member 17 should preferably be made slightly larger than that of the outer periphery of the roller 1 for closer contact of the members 17 with the surface of the roller 1 and also for facilitation of adjustments during assembly.

As is clear from the foregoing description, according to the present invention, since the peripheral surface of the developing material supplying roller is provided with the flat recessed portions for measuring the amount of the developing material to be fed, there is no possibility that the developing material remains in corner portions as in the V-shaped recesses in the conventional arrangements, and the developing material packed in the recesses of the supplying roller is positively scraped off said recessed portions by the scraping member. The above arrangement of the present invention, together with the accurate measuring of the amount of developing material to be supplied from such recesses by the regulating member which covers the entire surface of said recesses, makes it possible to supply the predetermined amount of developing material at all times. Furthermore, since the peripheral portion of said developing material supplying roller is sealed by the regulating member and shield member confronting said regulating member, with the opposite end portions of said supplying roller sealed by the end portion shield members, there is no leakage of the developing material toward the side of the developing apparatus, and thus, the supply of the predetermined amount of the developing material is achieved.

Referring now to FIGS. 10 to 12, there is shown another modification of the developing material supplying device T of FIGS. 4 to 8. The modified developing material supplying device TA is provided with an arrangement for detecting the amount of developing material remaining together with the developing material stirring means incorporated in the storage tank 4 for indicating mecessity for replenishing the developing material storage tank 4 with the developing material when the amount of developing material accommodated in the storage tank 4 has been reduced below a predetermined level and also for preventing improper supplying of the developing material from the storage tank 4 to the developing apparatus due to solidification of the developing material within the storage tank 4 arising from influence of moisture, etc.

In the modified developing material supplying device TA, the developing material stirring plates **35*a* and 35*b* respectively supported by corresponding arms 35*a*1 and 35*b*1 secured to pivotable shafts 35*a*2 and 35*b*2 as shown in FIG. 12 are provided within the storage tank 4 for pivotal movement within said storage tank 4** for constant physical stirring of the developing material W in the manner as described more in detail later.

As shown in FIG. 11, the developing material supplying device TA further includes a driving disc 108 provided on the rear side wall **4*a* of the storage tank 4 and lower casing 4*c* and arranged to be rotated about a shaft 108*a* by a driving means (not shown) in the direction shown by the arrow b, and a first arm 110 pivotally connected at its one end to a portion of the surface of the disc 108 by a pin 109 and at its other end to corresponding ends of a second and a third arms 112 and 113 by a pin 11. The other end of the second arm 112 is secured to the shaft 35*b*2 of the arm 35*b*1 for the stirring plate 35*b* for movement as one unit with said arm 35*b*1. To the other end of the third arm 113, one end of a fourth arm 115 is pivotally connected by a pin 114. The fourth arm 115 is pivotally connected at its other end to the shaft 35*a*2 (of the arms 35*a*1 for the stirring plate 35*a*) which is secured to a fifth arm 117, and provided, at its side edge, with a projection 121 which contacts the corresponding side edge of the fifth arm 117 for causing said fifth arm 117 to pivot in the direction indicated by the arrow d when said fourth arm 115 is pivoted in said direction d following rotation of the disc 108, and thus, the fifth arm 117 fixed to the shaft 35*a*2 is pivotable together with the stirring plate 35*a* as one unit. Meanwhile, the fifth arm 117 is normally urged in the direction opposite to that indicated by the arrow d by a spring 118 connected between the side wall 4*a* and one end of said arm 117. Adjacent to the fifth arm 117, there is disposed a microswitch 120 for detecting that the amount of the developing material remaining within the storage tank 4 is reduced below the predetermined level. The microswitch 120 is arranged to be turned ON by the contact of the other end 117*a* of the fifth arm 117 with the actuator 119 of the microswitch 120 when the fifth arm 117** is moved in the direction opposite to that shown by the arrow d beyond a predetermined degree.

By the above arrangement, when the disc 108 is rotated in the direction indicated by the arrow b, the second arm 112 is pivoted in the direction of the arrow c in FIG. 11 through the first arm 110. Simultaneously, the stirring plate **35*a* secured to the shaft 35*b*2 is also pivoted in the direction of the arrow c' through the arms 35*b*1 for stirring the developing material W within the storage tank 4, while the fourth arm 115 is similarly pivoted through the third arm 113. When the fourth arm 115 is moved in the direction of the arrow d, the projection 121 provided on the fourth arm 115 is brought into contact with the side edge of the fifth arm 117 for causing the fifth arm 117 to pivot in the direction of the arrow d against the urging force of the spring 118. In the above case, the stirring plate 35*a* secured to the shaft 35*a*2 through the arms 35*a*1 is also pivoted in the direction indicated by the arrow e in FIG. 10. On the other hand, although the fifth arm 117 is released from the driving force by the projection 121 when the fourth arm 115 is moved in the direction opposite to that of the arrow d, said arm 117 is pivoted in the direction opposite to that of the arrow d by the urging force of the spring 118. In the above case, however, if a sufficient amount of the developing material W is present within the storage tank 4, the stirring plate 35*a* is prevented from carring out pivotal movement by the developing material W, and the fifth arm 117 associated with the stirring plate 35*a* for simultaneous movement therewith is also prevented from moving and stopped. More specifically, the fifth arm 117 and stirring plate 35*a* are stopped in the state when the resistant force applied to the stirring plate 35*a* by the developing material W within the storage tank 4 and the urging force by the spring 118** are balanced.

On the contrary, as the amount of the developing material remaining in the storage tank 4 is gradually decreased, the resistance force as described above is also gradually reduced so that it is finally zero, and consequently, the fifth arm 117 is pivoted in a similar manner to the fourth arm 115. In other words, when the fourth arm 115 is pivoted in the direction of the arrow d, the fifth arm 117 is driven by the projection 121 on the arm 115 and also follows the pivotal movement of the arm 115, while on the contrary, when the arm 115 is moved in the direction opposite to that of the arrow d, the fifth arm 117 follows the movement of the arm 115 due to the urging force of the spring 118 with the side edge of the arm 117 contacting the projection 121 on the fourth arm 115.

Accordingly, in the above case, the end 117*a* of the fifth arm 117 intermittently depresses the actuator 119 of the microswitch 120, which emits an electrical signal indicating the reduction of the amount of the developing material within the storage tank 4 when it is turned ON. In the above embodiment, since the electrical signal is of an intermittent nature, when an indicator lamp (not shown) is provided which is energized by the microswitch 120, the indication is effectively given by the turning ON and OFF of the indicator lamp.

As is seen from the above description, according to the embodiment of FIGS. 10 to 12, when the amount of the developing material remaining within the storage tank 4 becomes small, the deficiency is automatically detected, and thus, it is possible to indicate the necessity for replenishing the storage tank with the developing material before the developing material within the storage tank has been completely used up, i.e. when the amount remaining has been reduced to less than a predetermined level, through the simple construction utilizing the movements of the stirring plates 35*a* and 35*b*. Furthermore, since the detection is carried out while the solidification of the developing material is prevented by the stirring plates 35*a* and 35*b*, not only is favorable replenishment of the developing material is made possible, but positive detection free from errors due to insufficient fluidity of the developing material arising from absorption of moisture is advantageously effected.

It should be noted here that, if necessary the developing material stirring plates 35*a* and 35*b* described as employed in the arrangement of FIGS. 10 and 12 for pivotal movement within the storage tank may be replaced by brushes or the equivalent arranged for sliding movement, and that instead of the spring 118 described as employed for the urging means, the weight of the arms or balancers and the like may be utilized.

It should also be noted that the driving means employing the disc 108, and arms 110, 113, 115 etc., may be replaced by driving means utilizing solenoids, etc., and that the microswitch 120 described as being used in the arrangement of FIGS. 10 to 12 may also be replaced by a switching element such as a reed switch, a photoelectric element and the like or by other mechanical detecting means.

As is clear from the foregoing description, according to the arrangement of FIGS. 10 to 12, positive detection of the amount of remaining developing material and prevention of solidification of the developing material are advantageously achieved by a simple construction.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A developing material supplying device for supplying developing material to an electrostatic latent image developing apparatus, which supplying device comprises:

a developing material storage tank for accommodating therein developing material to be supplied and having a developing material supplying opening in the lower portion thereof;

a developing material supplying roller rotatably mounted in said developing material supplying opening of said developing material storage tank and having at least one recessed portion in the peripheral surface thereof for measuring the amount of the developing material to be supplied, said recessed portion extending along substantially the entire length of said supplying roller except for the opposite end portions of said supplying roller;

a regulating member for regulating the amount of developing material to be supplied by said supplying roller and being mounted at a position where said recessed portion of said supplying roller in said supplying opening moves from the interior to the exterior of said storage tank during rotation of said supplying roller, said regulating member having an arcuate surface which is opposed to the peripheral surface of said supplying roller and which has a radius of curvature approximately equal to that of said circumferential surface of said supplying roller and having a size sufficient for covering the entire portion of the peripheral surface of the recessed portion of said supplying roller and contacting the opposite end portions of said supplying roller, said regulating member being mounted for movement toward and away from said peripheral surface of said supplying roller around an axis of rotation, said regulating member lying on the side of a line extending from the axis of rotation through the axis of rotation of said supplying roller, the regulating member being positioned on a side of the line in which the direction of rotation of said supplying roller is away from said line, and biasing means urging said regulating member toward said circumferential surface of said supplying roller with the portions of said regulating member contacting said end portions of said supplying roller contacting said end portions under pressure; and a shield member being mounted at a position where said recessed portion of said supplying roller in said supplying opening moves from the exterior to the interior of said storage tank during rotation of said supplying roller, said shield member having an arcuate surface which is opposed to the peripheral surface of said supplying roller and which has a radius of curvature approximately equal to that of said circumferential surface of said supplying roller and having a size sufficient for covering the entire portion of the peripheral surface of the recessed portion of said supplying roller and contacting the opposite end portions of said supplying roller, said shield member being mounted for movement toward and away from said peripheral surface of said supplying roller around an axis of rotation, said shield member lying on the side of a line extending from the axis of rotation through the axis of rotation of said supplying roller, said shield member being positioned on the side of the line in which the direction of rotation of said supplying roller is away from said line, and biasing means urging said shield member toward said circumferential surface of said supplying roller with the portions of said shield member contacting said end portions of said supplying roller contacting said end portions under pressure.

2. A developing material supplying device as claimed in claim 1, wherein said recessed portion of said developing material supplying roller includes three identical recesses of flat shape which are at equal intervals on said circumferential surface of said developing material supplying roller and extending along substantially the entire length of said supplying roller except for the opposite end portions of said supplying roller.

3. A developing material supplying device as claimed in claim 1, further including a developing material scraping member contacting the circumferential surface of said supplying roller under pressure at a position outside said developing material storage tank for scraping off the developing material adhering to said recessed portion of said supplying roller.

4. A developing material supplying device as claimed in claim 1, further including a driving mechanism for said developing material supplying roller which comprises an eccentric cam plate capable of being driven by a one rotation clutch , a reciprocating member operatively associated with said cam plate for being moved in reciprocating movement by said cam plate, and one way clutch means connected to said reciprocating member for converting the movement in one direction of said reciprocating member into the rotation of said developing material supplying roller.

5. A developing material supplying device as claimed in claim 1 in which said supplying roller has a plurality of recessed portions each being defined by a surface extending along a chord of the cross-section of the supplying roller.

6. A developing material supplying device as claimed in claim 1 in which said biasing means for said regulating member and said biasing means for said shield member each comprise a plate spring bent into an L-shape, the free end of one leg of said spring being mounted on the apparatus and the free end of the other leg having the respective member secured thereto, said axis of rotation around which the respective members move toward and away from said supplying roller being the bend in said spring.

7. A developing material supplying device as claimed in clim 6 in which said spring further has a portion on the free end of said other leg thereof bent in the opposite direction to said L-shape bend and to the free end of which the corresponding member is integrally secured, each said portion being bent in the shape of said arcuate surface, and each said member including a mass of resilient material in the space between said one leg of said spring and the corresponding said portion.

* * * * *